United States Patent
Pflueger et al.

(10) Patent No.: US 9,780,631 B2
(45) Date of Patent: Oct. 3, 2017

(54) METHOD FOR STAMPING COIL SIDES OF A STATOR WINDING

(75) Inventors: Klaus Pflueger, Eberdingen (DE); Martin Henne, Moeglingen (DE); Klaus Herbold, Asperg (DE); Christoph Schwarzkopf, Walheim (DE); Helmut Kreuzer, Schwieberdingen (DE); Steffen Didra, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 525 days.

(21) Appl. No.: 13/991,332

(22) PCT Filed: Nov. 30, 2011

(86) PCT No.: PCT/EP2011/071417
§ 371 (c)(1),
(2), (4) Date: Jun. 3, 2013

(87) PCT Pub. No.: WO2012/072695
PCT Pub. Date: Jun. 7, 2012

(65) Prior Publication Data
US 2013/0257215 A1     Oct. 3, 2013

(30) Foreign Application Priority Data
Dec. 1, 2010  (DE) .......................... 102010053716

(51) Int. Cl.
*H02K 15/04*   (2006.01)
*H02K 15/02*   (2006.01)
*H02K 3/04*    (2006.01)
*H02K 3/12*    (2006.01)

(52) U.S. Cl.
CPC ............ *H02K 15/024* (2013.01); *H02K 3/04* (2013.01); *H02K 15/0421* (2013.01); *H02K 3/12* (2013.01); *Y10T 29/49009* (2015.01)

(58) Field of Classification Search
CPC ........ H02K 1/165; H02K 15/00; H02K 15/02; H02K 3/04; H02K 3/12; H02K 15/024; H02K 15/0421; Y10T 29/49009
See application file for complete search history.

(56) References Cited

U.S. PATENT DOCUMENTS

| 4,147,398 | A | * | 4/1979 | Lill | .............................. 439/397 |
| 4,177,397 | A | * | 12/1979 | Lill | .............................. 310/71 |
| 6,229,241 | B1 | * | 5/2001 | Ishigami | ................. H02K 3/12 |
| | | | | | 29/596 |

FOREIGN PATENT DOCUMENTS

| DE | 102005048094 | | 4/2007 |
| DE | 102007034322 | | 1/2009 |
| EP | 1578002 | | 9/2005 |
| JP | 3550880 | * | 8/2004 |
| WO | 0154254 | | 7/2001 |

OTHER PUBLICATIONS

International Search Report and Written Opinion for Application No. PCT/EP2011/071417 dated Nov. 28, 2012 (8 pages).

* cited by examiner

*Primary Examiner* — Carl Arbes
(74) *Attorney, Agent, or Firm* — Michael Best & Friedrich LLP

(57) ABSTRACT

Method for stamping multiple coil sides (96) for a stator winding (18), characterized in that the multiple coil sides (96) are arranged in a grooved row (90), the shaping process taking place at a force (F), the direction of which runs at an angle (α) greater than zero relative to the grooved row (90).

8 Claims, 3 Drawing Sheets

METHOD FOR STAMPING COIL SIDES OF A STATOR WINDING

BACKGROUND OF THE INVENTION

When designing the slot geometry in the stator core of electrical machines, the electrical filling factor, that is to say the quotient of copper area to slot area, is a critical parameter for describing the performance or the efficiency of the overall system. Conventional stator production methods, for example the pull-in method, allow values of from 40% to a maximum of 50% of electrical filling.

In order to further increase these values, the wires in the slot region can be compressed by a stamping process, see WO-2001054254 A1 for example. A region of over 60% of electrical filling can be achieved in the stator slots as a result. Assuming certain structural dependencies are taken into consideration (for example compact design of the winding heads, . . . ), more electrical power can be generated with relatively small structural volumes with less material being used.

Certain boundary conditions are of critical importance when technically implementing the stamping process: for example, wire crossings in the slot region can lead to pinching with a greatly reduced cross section, this leading to local overheating, and the corresponding consequences, during operation due to an increased non-reactive resistance.

High electrical filling factors are made possible particularly due to high mechanical filling in the stamping tools, and therefore the aim is to fill the stamping slot virtually to 100% taking into account the possible wire tolerances. However, this requires all the wires in the slot region to be deformed as uniformly as possible.

This requirement is not met if an expedient stamping direction is not chosen. If the wire is stamped in the radial direction (in the direction of the slot height), the wire, which is in contact with the stamping punch, will be deformed to an overproportional extent in comparison to the wire in the stamped slot base because the stamping pressure is not uniformly distributed within the slot due to mechanical friction and other influences. Purely on a calculation basis, a stamped slot filling of greater than 100% is established on the stamping punch. As a result, copper is pushed into the winding heads and therefore into the electromagnetically inactive region of the machine in the longitudinal direction of the wire. Therefore, the wire cannot be stamped in an optimum manner.

SUMMARY OF THE INVENTION

The invention provides a method for stamping a plurality of coil sides for a stator winding, characterized in that the plurality of coil sides are arranged in a slot row, wherein shaping is performed by means of a force, the direction of this force being at an angle of greater than zero in relation to the slot row.

BRIEF DESCRIPTION OF THE DRAWINGS

The invention will be explained in greater detail in the text which follows by way of example and using the figures, in which.

The envelope curve illustrated in the figures represents the contour of the rows which is intended to be achieved after shaping.

DETAILED DESCRIPTION

Figure 1:
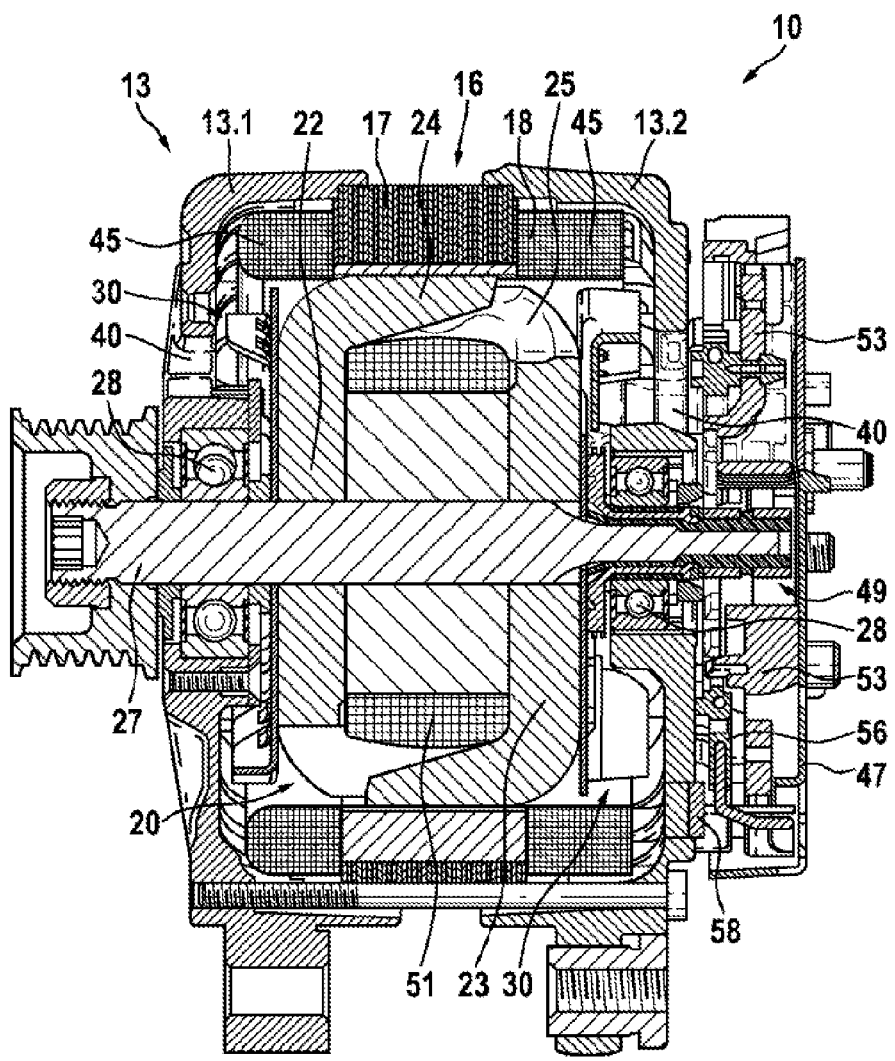
FIG. 1 shows a longitudinal section through an electrical machine.

FIG. 1 shows a longitudinal section through an electrical machine 10, in this case in the form of a generator or AC generator for motor vehicles. This electrical machine 10 has, amongst other things, a two-part housing 13 which comprises a first end plate 13.1 and a second end plate 13.2. The end plate 13.1 and the end plate 13.2 accommodate what is known as a stator 16 between them, said stator firstly comprising a substantially ring-like stator core 17, and a stator winding 18 being inserted into the radially inwardly directed, axially extending slots in said stator. This annular stator 16, by way of its radially inwardly directed slotted surface, surrounds a rotor 20 which is in the form of a claw pole rotor. The rotor 20 comprises, amongst other things, two claw pole printed circuits 22 and 23, with claw pole fingers 24 and 25 which each extend in the axial direction being arranged on the outer circumference thereof. The two claw pole printed circuits 22 and 23 are arranged in the rotor 20 in such a way that their claw pole fingers 24 and, respectively, 25 which extend in the axial direction alternate with one another on the circumference of the rotor 20. This produces magnetically required intermediate spaces between the claw pole fingers 24 and 25 which are magnetized in opposite directions, said intermediate spaces being called claw pole intermediate spaces. The rotor 20 is rotatably mounted by means of a shaft 27 and in each case one rolling bearing 28, which is located on in each case one rotor side, in the respective end plates 13.1 and 13.2.

The rotor 20 has a total of two axial end faces to which a fan 30 is attached in each case. This fan 30 substantially comprises a plate-like or disk-like section from which fan blades extend in a known manner. These fans 30 are used to allow air to be exchanged between the outside of the electrical machine 10 and the interior space in the electrical machine 10 via openings 40 in the end plates 13.1 and 13.2. To this end, the openings 40 are provided substantially at the axial ends of the end plates 13.1 and 13.2, cooling air being drawn into the interior space in the electrical machine 10 by means of the fans 30 via said openings. This cooling air is accelerated radially outward due to the rotation of the fans 30, and therefore said cooling air can pass through the winding overhang 45 which is permeable to cooling air. As a result of this effect, the winding overhang 45 is cooled. After passing through the winding overhang 45 or after flowing around said winding overhang 45, the cooling air moves radially outward through openings—not illustrated in FIG. 1 in this case.

A protective cap 47 which protects various components against environmental influences is located on the right-hand side of FIG. 1. This protective cap 47 covers, for example, what is known as a slip ring assembly 49 which serves to supply field current to a field winding 51. A heat sink 53, which acts as a positive heat sink in this case, is arranged around this slip ring assembly 49. The end plate 13.2 acts as what is known as a negative heat sink. A connection plate 56 is arranged between the end plate 13.2 and the heat sink 53, said connection plate serving to connect negative diodes 58 which are arranged in the end plate 13.2 and positive diodes—not shown in this illustration in this case—in the heat sink 53 to one another and thereby to establish a bridge circuit which is known per se.

Description of the Shaping Process

Figure 3:
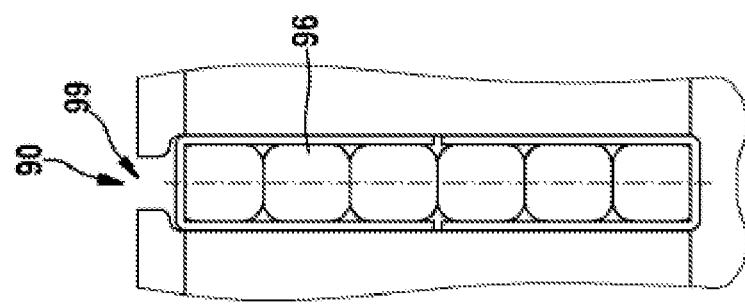
FIG. 3 shows a row of previously round wires which have been shaped to have parallel flanks and have been inserted into a slot after insulation.
Figure 2:
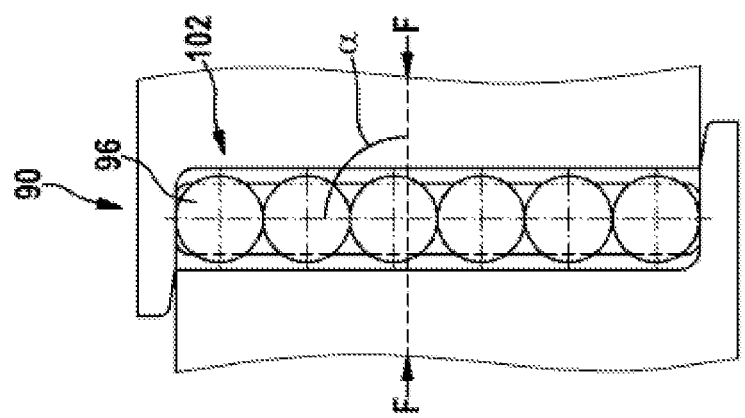
FIG. 2 shows a row of round wires or coil sides which are intended to be shaped to have parallel flanks.

FIG. 2 shows a slot row 90 of round wires 93 or coil sides 96 which are intended to be shaped to have parallel flanks Given the desired slot geometry with parallel flanks, also see FIG. 3 with a slot 99, all the round wires 93 are uniformly deformed, and accordingly the slot 99 can be filled to a uniform level. Wire damage is not expected. This provides a method for stamping a plurality of coils sides 96 for a stator winding 18, wherein the plurality of coil sides 96 are arranged in a slot row 90, wherein shaping is performed by means of a force F, the direction of this force being at an angle α of greater than zero in relation to the slot row 90. The angle α is virtually or exactly 90°. The slot row 90 defines a direction in which the round wires 93 are stacked The angle α proceeds from this direction.

In respect of the direction of the forces F which are directed toward one another, provision can be also made, as an alternative, for the forces F to be oriented such that they act diagonally through the slot row 90. With reference to the result illustrated in FIG. 3, this means that the forces act, for example, firstly from the slot base at the bottom left and secondly from the slot slit side at the top right. Alternatively, provision is made for the forces F to act at an angle α >45° in relation to one another. The observations in this paragraph also apply to trapezoidal slot geometries.

Figure 4:
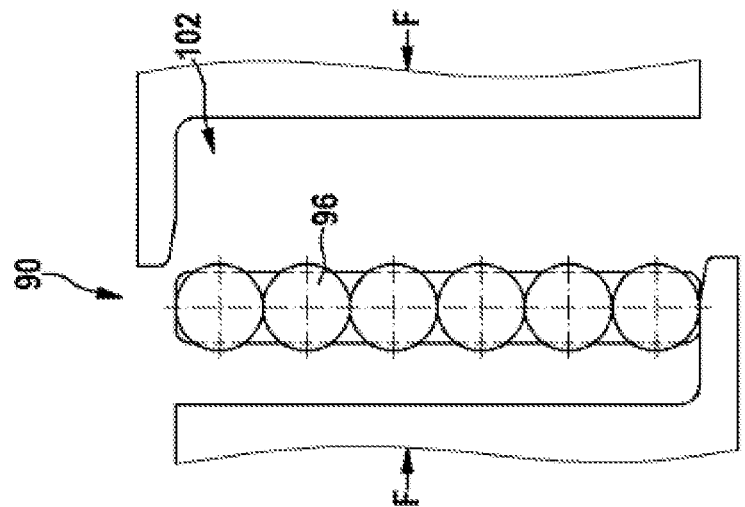
FIG. 4 shows a row of round wires or coil sides which are intended to be shaped to be trapezoidal.

When using trapezoidal slot geometries, FIG. 4, similar problems to those encountered with radial stamping are also encountered with tangential stamping in a stamping chamber 102. The deformations in the upper narrow region of the stamping chamber 102 are not ideal, and the deformations in the broad region of the slot 99 (bottom) are not ideal either.

Figure 7:
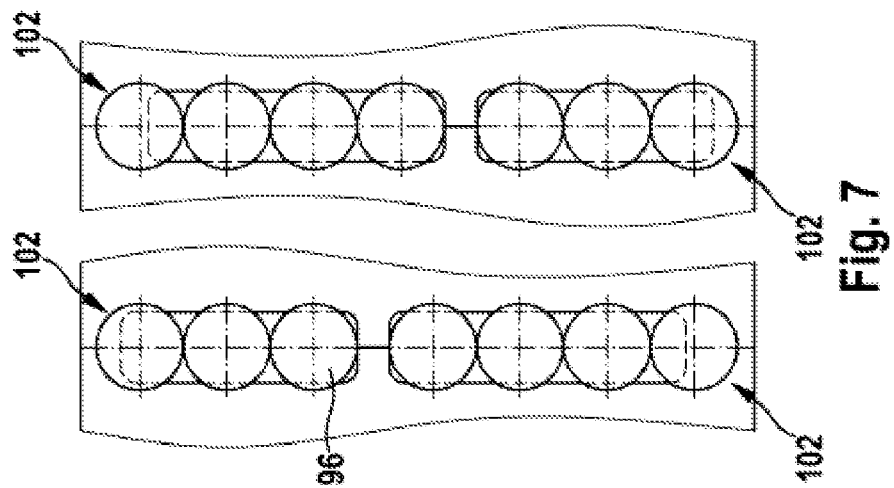
FIG. 7 shows four row elements or two divided complete rows of round wires or coil sides with an odd number of coil sides/rows which are intended to be shaped to be trapezoidal.
Figure 6:
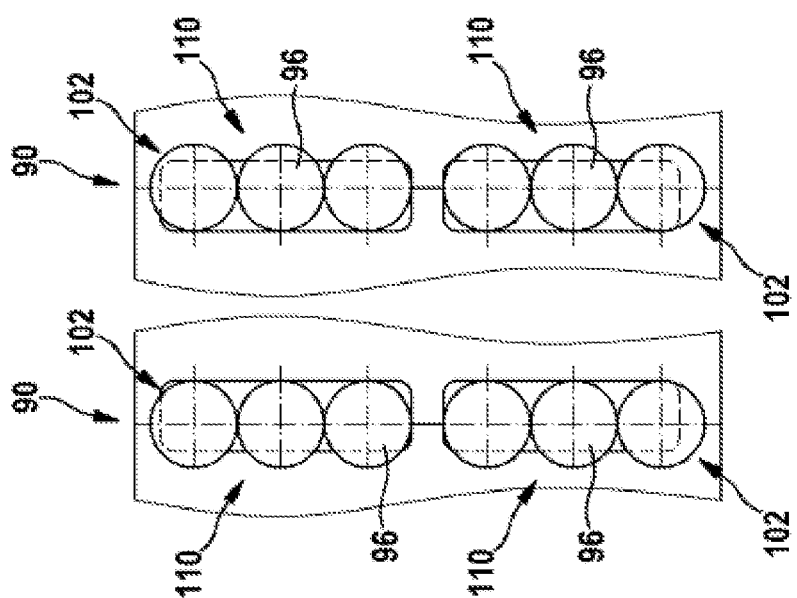
FIG. 6 shows four half-rows or two halves of complete-rows of round wires or coil sides with an even number of coil sides which are intended to be shaped to be trapezoidal.
Figure 5:
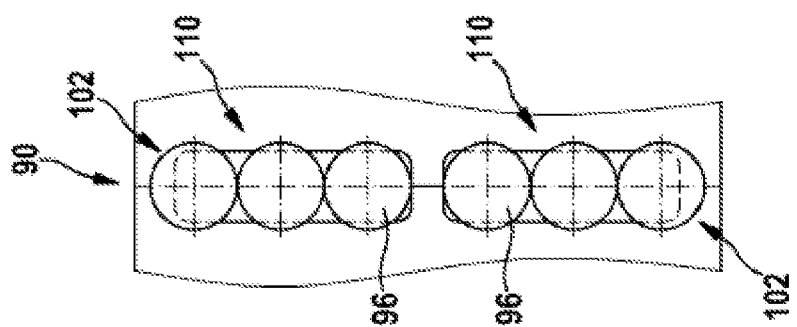
FIG. 5 shows two half-rows of round wires or coil sides which are intended to be shaped to have parallel flanks.

FIGS. 5, 6 and 7 illustrate how stator windings or rows 90 of round wires 93 or coil sides 96 are stamped in two stamping chambers 102. Optimized electromagnetic designs with electrical filling factors of greater than 60% can be implemented by mechanical filling to a uniform level in the chambers. Stator slot designs with trapezoidal slot shapes draw particular benefit from this principle.

Uniform mechanical filling of the stamping slots can be achieved by using two stamping chambers 102. Taking into consideration the possible wire tolerances, this allows a filling level of the stamping slot of virtually 100%. Therefore, optimized electromagnetic designs with electrical filling levels of greater than 60% are possible (see FIG. 5).

The invention provides a method wherein the coil sides 96 are arranged in a plurality of row elements 110, wherein a plurality of row elements 110 form a slot row 90.

FIGS. 6 and 7 provide a method wherein the coil sides 96 are arranged in a plurality of row elements 110, wherein a plurality of row elements 110 form a slot row 90 and a plurality of slot rows 90 are provided for each slot 99. The row elements 110 of a slot row 90 have a different number of coil sides 96.

The row elements 110 are stamped in stamping chambers 102 which are separated from one another.

Calculated stamped slot filling levels of greater than 100% in subregions of the slot are avoided by means of two stamping chambers. Impermissible deformations on individual wires no longer occur and copper is not pushed into the electromagnetically inactive winding heads in the longitudinal direction (perpendicular to the plane of the illustration). That is to say, the calculated optimized design is also used in reality.

Designs with trapezoidal slots can also be implemented with two separated stamping chambers in particular. Compensation movements between the narrow and broad region of the stamping chamber are not necessary. Influences which are difficult to control, for example the friction within the stamping chamber, have no influence on the design quality. There is no restriction in respect of the slot shape in this case; in particular, different trapezoidal shapes can be produced.

The proposed principle can be used for various designs. Both single-row wire arrangements, for example in a 5-phase system with 80 slots (see FIG. 5), and also double-row arrangements, for example in a 3-phase system with 48 slots (see FIG. 6), can be realized. Further multi-row arrangements are feasible in principle, the number of slots or number of poles in the design being arbitrary. Furthermore, designs with an odd number of conductors can also be constructed given corresponding calculation of the stamping chamber areas (see FIG. 7).

Stamping in two chambers generates a clear and above all reproducible separation plane between the slot upper layer and the slot lower layer. Different conditions within the stamping slot, for example friction, wire strength or wire diameter, have no influence on this separation plane. This can be highly advantageous in subsequent process steps: for example, a setting process of the coil elements can be performed along this separation plane.

Provision is made of a stator having a stator winding (18) which is produced in accordance with one of the method steps presented here.

The invention claimed is:

1. A method for stamping a plurality of coil sides (96) for a stator winding (18), the method comprising
arranging the plurality of coil sides (96) along a stacking direction in a slot row (90), and
applying a force (F) at an angle (α) of greater than zero in relation to the stacking direction of the slot row (90) to uniformly shape all of the plurality of coil sides (96),
wherein the plurality of coil sides (96) that are arranged in the stacking direction in the slot row (90) are received in a stamping chamber (102),
wherein the stamping chamber (102) is formed by two forming tool parts, and
wherein the stamping chamber (102) bounds the plurality of coil sides (96) from four sides, including two directly neighboring sides provided by one of the two forming tool part and two directly neighboring sides provided by the other of the two forming tool parts.

2. The method as claimed in claim 1, wherein the coil sides (96) are arranged in a plurality of row elements (110) formed by separate groupings of coil sides (96), and wherein the plurality of row elements (110) form the slot row (90).

3. The method as claimed in claim 2, wherein a plurality of slot rows (90) are provided for one slot (99).

4. The method as claimed in claim 2, wherein the plurality of row elements (110) includes two separate groupings of coil sides (96) that differ in number of coil sides (96).

5. The method as claimed in claim 4, wherein each of the plurality of row elements (110) is stamped in a separate stamping chamber (102) formed by the two forming tool parts.

6. The method as claimed in claim 2, wherein each seperate grouping of coilsides (96) forming each separate one of the plurality of row elements (110) is stamped in a separate stamping chamber (102) formed by the two forming tool parts.

7. A method for stamping a plurality of coil sides (96) for a stator winding (18), the method comprising
arranging the plurality of coil sides (96) along a stacking direction in a slot row (90), and
applying a force (F) at an angle ($\alpha$) of greater than zero in relation to the stacking direction of the slot row (90) to uniformly shape all of the plurality of coil sides (96),
wherein the coil sides (96) are arranged in a plurality of row elements (110), and the plurality of row elements (110) form the slot row (90),
wherein a plurality of slot rows (90) are provided for one slot (99), and wherein the plurality of row elements (110) are stamped in stamping chambers (102) which are separated from one another.

8. A method for stamping a plurality of coil sides (96) for a stator winding (18), the method comprising
arranging the plurality of coil sides (96) along a stacking direction in a slot row (90), and
applying a force (F) at an angle ($\alpha$) of greater than zero in relation to the stacking direction of the slot row (90) to uniformly shape all of the plurality of coil sides (96),
wherein the coil sides (96) are arranged in a plurality of row elements (110), and the plurality of row elements (110) form the slot row (90),
wherein the plurality of row elements (110) are stamped in stamping chambers (102) which are separated from one another.

* * * * *